United States Patent
Patisaul et al.

(10) Patent No.: US 8,619,958 B2
(45) Date of Patent: Dec. 31, 2013

(54) COMMUNICATION RANKING AND ORGANIZATION

(75) Inventors: Charles Edward Patisaul, Cary, NC (US); Heather Beaupre Patisaul, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 935 days.

(21) Appl. No.: 12/702,458

(22) Filed: Feb. 9, 2010

(65) Prior Publication Data

US 2011/0194679 A1   Aug. 11, 2011

(51) Int. Cl.
*H04M 1/56* (2006.01)
*H04M 15/06* (2006.01)

(52) U.S. Cl.
USPC ...................... 379/142.04; 455/418

(58) Field of Classification Search
USPC ...................... 379/142.04; 455/418
See application file for complete search history.

(56) References Cited

U.S. PATENT DOCUMENTS

| | | |
|---|---|---|
| 2005/0031111 A1 | 2/2005 | Igarashi |
| 2006/0035632 A1 | 2/2006 | Sorvari et al. |
| 2006/0171524 A1 | 8/2006 | Tsuchiya et al. |
| 2009/0274286 A1 | 11/2009 | O'shaughnessy et al. |

FOREIGN PATENT DOCUMENTS

WO   WO2004090713 A1   10/2004

OTHER PUBLICATIONS

International Search Report and Written Opinion—PCT/US2011/024052, ISA/EPO—May 18, 2011.
Partial International Search Report and Written Opinion—PCT/US2011/024052—ISA/EPO—Apr. 13, 2011.

*Primary Examiner* — Quynh Nguyen
(74) *Attorney, Agent, or Firm* — Linda G. Gunderson

(57) ABSTRACT

Methods and apparatuses are disclosed herein for organizing communication information. Data received associated with a communication is recorded at the communication device. An identifier is associated with the communication. The identifier indicates a unique identity. A call score is calculated for the identifier at the communication device based on the communication. The particular identifier is ranked in a list in accordance with the calculated call score.

68 Claims, 6 Drawing Sheets

COMMUNICATION RANKING AND ORGANIZATION

FIELD OF DISCLOSURE

The embodiments generally relate towards managing data on a communication device and more specifically, to organizing a communication lists by sorting IDs based on the number of communications made and how recently they were made.

BACKGROUND

Conventional communication systems may or may not support storage and display of callers and/or call lists. However, most modern devices support some ability to display callers and/or call lists. For example, a fixed terminal (e.g., a land line phone in an office) may have a large display that can show many entries and even multiple keys for accessing entries based on categories, name, etc. However, in mobile terminals the displays and display options are not normally as extensive.

Smaller and more powerful mobile personal computing devices are typically severely resource constrained. For example, the screen size, amount of available memory and file system space, input and output capabilities and processing capability may each be limited by the small size of the device.

Because of the small screen size, it is often inconvenient to scroll through a long list of phone numbers in order to access a particular phone number that is desired. This can be quite inconvenient if the numbers that are most relevant to a user are at the end of the list and/or if the amount of phone calls that are received are relatively large.

Accordingly, it would be beneficial to allow more options for organizing data including a calling list.

SUMMARY

Exemplary embodiments disclosed herein are directed towards methods for organizing communications information.

Accordingly, an embodiment can include a method for organizing communications at a communication device comprising: recording data associated with a communication at the communication device; associating an identifier with the communication, wherein the identifier indicates a unique identity; calculating a call score for the identifier at the communication device based on the communication; and ranking the identifier in a list in accordance with the calculated call score.

Another embodiment can include a communication device including a communications organizer comprising: means for recording data associated with a communication at the communication device; means for associating an identifier with the communication, wherein the identifier indicates a unique identity; means for calculating a call score for the identifier at the communication device based on the communication; and means for ranking the identifier in a list in accordance with the calculated call score.

Another embodiment can include a method for organizing communications at a communication device comprising: a step for recording data associated with a communication at the communication device; a step for associating an identifier with the communication based on the recorded data, wherein the identifier indicates a unique identity; a step for calculating a call score for the identifier at the communication device based on the communication; and a step for ranking the identifier in a list in accordance with the calculated call score.

Another embodiment can include a communication device including a communications organizer comprising: logic configured to record data associated with a communication at the communication device; logic configured to associate an identifier with the communication, wherein the identifier indicates a unique identity; logic configured to calculate a call score for the identifier at the communication device based on the communication; and logic configured to rank the identifier in a list in accordance with the calculated call score.

BRIEF DESCRIPTION OF THE DRAWINGS

The accompanying drawings are presented to aid in the description of embodiments and are provided solely for illustration of the embodiments and not limitation thereof.

DETAILED DESCRIPTION

Figure 1:
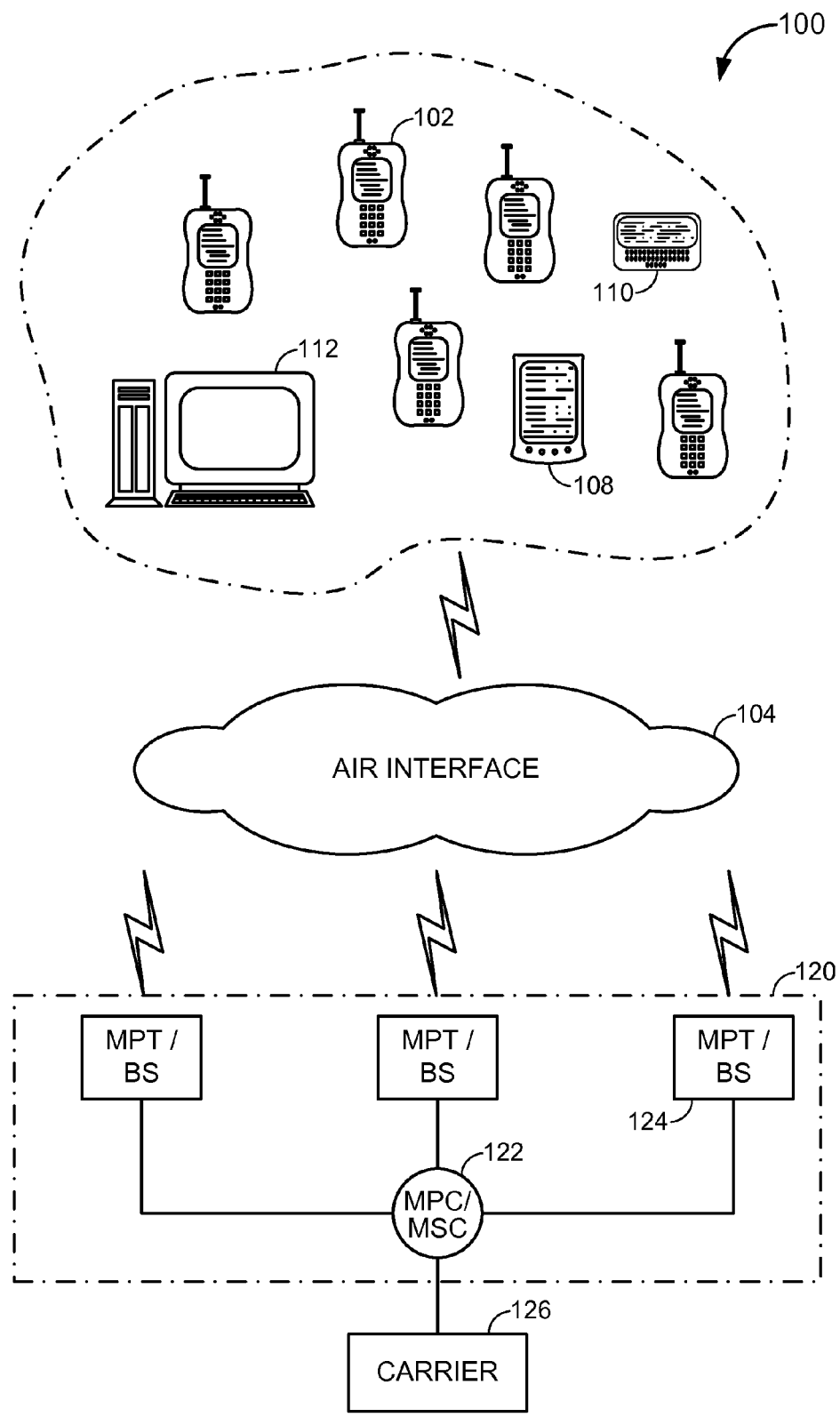
FIG. 1 is a block diagram illustrating a wireless network architecture that supports access terminals.

Aspects of the various embodiments are disclosed in the following description and related drawings directed to specific embodiments. Alternate embodiments may be devised without departing from the scope of the invention. Additionally, well-known elements will not be described in detail or will be omitted so as not to obscure the relevant details of the described embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of the embodiments disclosed. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller and/or mobile switching center (MSC). Modem pool transceivers and modem pool controllers are parts of a network called an access network. An access network can transport data packets to, from and between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal.

Embodiments can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "subscriber terminal", "access terminal", "wireless device", "client device", "mobile terminal" and variations thereof may be used interchangeably.

Referring back to FIG. 1, the components of the wireless network 100 and interrelation of the elements of the exemplary embodiments are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carrier 126, the Internet, and/or other remote servers.

The RAN 120 controls messages (conventionally sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Conventionally, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is conventionally connected to the MPT/BS 124 by a network, the Internet and/or PSTN for data transfer and/or voice information. The MPT/BS 124 can broadcast voice and data messages wirelessly to the access terminals, such as cellular telephone 102. The MPT/BS 124, MPC/MSC 122 and other components may form the RAN 120, as is known in the art. However, alternate configurations may also be used and the various embodiments are not limited to the configuration illustrated.

Figure 2:
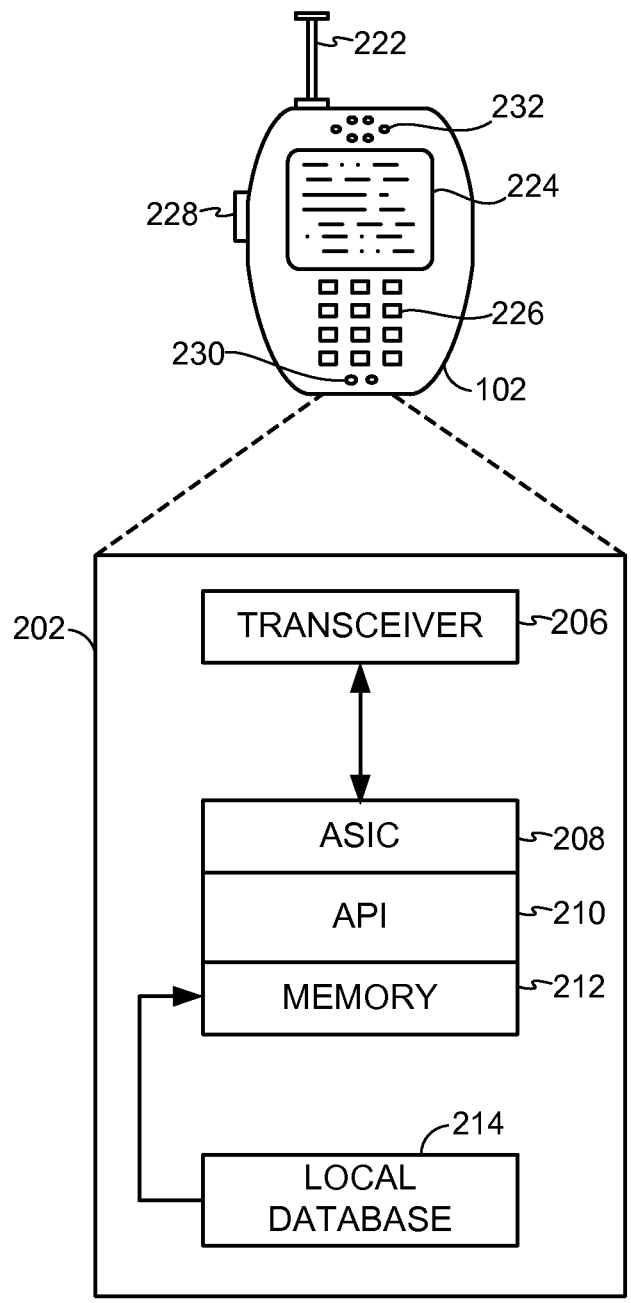
FIG. 2 is a block diagram illustrating an access terminal.

Referring to FIG. 2, the access terminal 102, such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is conventionally a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, keypad 226, push-to-talk button 228, audio input 230 and audio output 232 among other components, as is known in the art.

Accordingly, an embodiment can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the embodiments are not limited to the illustrated features or arrangement.

The following description of the disclosed embodiments is directed mainly to voice calls and pre-programmed messages in response thereto. However the embodiments are not limited to these examples. Those skilled in the art will appreciate that the embodiments can include audio data, video data, text messaging, Voice-Over-Internet Protocol (VoIP) calls, push-to-talk (PTT) calls, and the like. Accordingly, the examples provided herein are solely for purposes of illustration of the embodiments and are not to be construed as limiting the scope of the embodiments.

As used herein "access terminal", "client device", "wireless device" or "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein. Some examples of access terminals or wireless devices which may be used in accordance with various embodiments includes cellular telephones or other wireless communication units, PDAs, laptops, paging devices, navigation devices (e.g., GPS-based systems), handheld gaming devices, music or video content download units, and other like wireless communication devices.

The wireless communication between the client device 102 and the BTS 124 can be based on different technologies, such as code division multiple access (CDMA), time division multiple access (TDMA), frequency division multiple access (FDMA), the global system for mobile communications (GSM), or other protocols that may be used in a wireless communications network or a data communications network. The data communication is typically between the client device 102, BTS 124, and MSC 122. The MSC 122 can be connected to multiple data networks such as the carrier network 126, PSTN, the Internet, a virtual private network, and the like, thus allowing the client device access to a broader communication network. As discussed in the foregoing, in addition to voice transmission, data can be transmitted to the client device via SMS, data channels, broadcast channels, or other over-the-air methods known in the art.

As discussed in the background section, conventional systems provide limited alternatives for organizing communications (e.g., incoming/outgoing calls). Conventional systems merely record the calls in the temporal order that they were received.

In general, cellular phones have small displays/viewing screens. When a user accesses a phone directory or list of calls, it is often necessary to inconveniently scroll through a long list of phone numbers in order to access the particular phone number that is desired. This can be a considerable inconvenience to the user as well as causing unwanted delays.

Figure 3A:
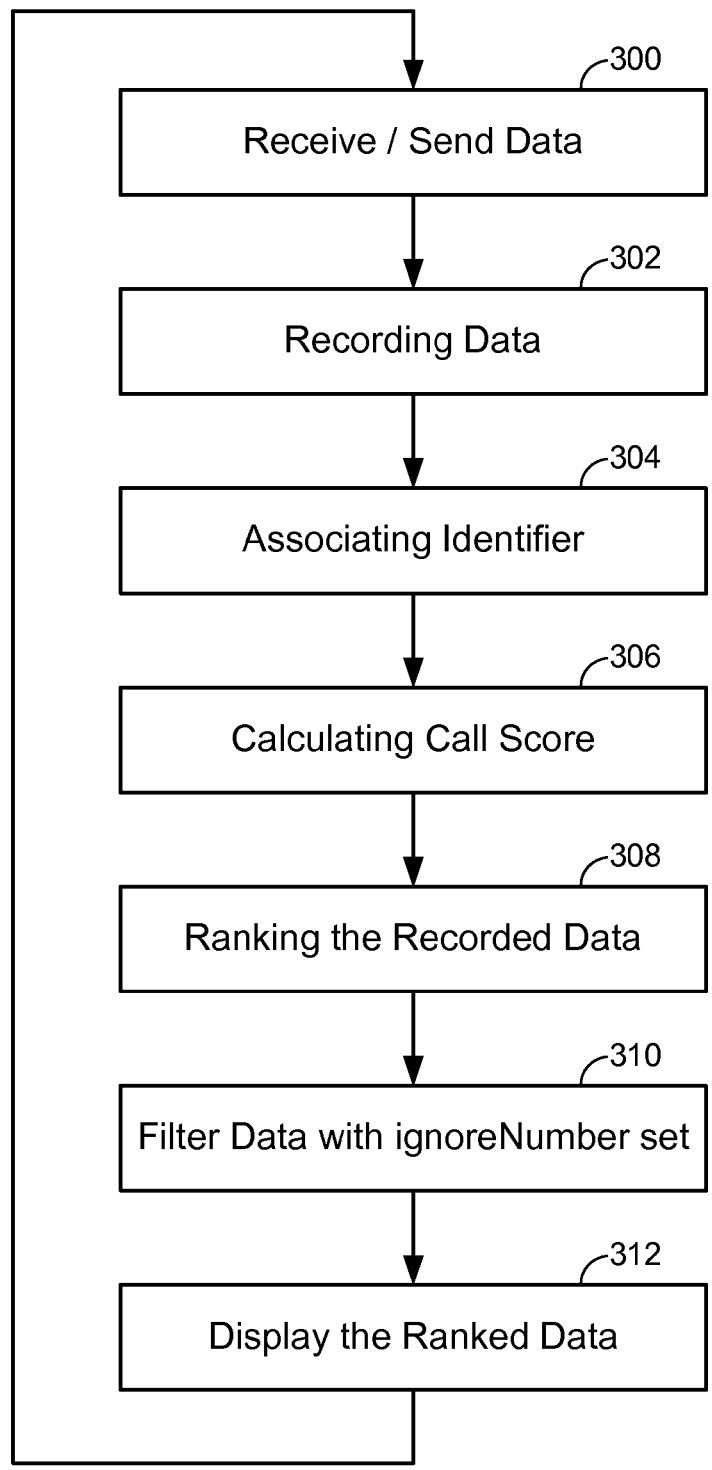
FIG. 3A is a flowchart illustrating aspects of a process for organizing a call list.

Referring to FIG. 3A, a flowchart illustrating aspects of at least one embodiment is provided. A communication is received/sent and organized at a communication device 300. The organization process is any type of organization that maintains the identity and integrity of the incoming/outgoing data in a convenient manner or in a manner desired by the user. The following description will describe one exemplary method of organizing the data (e.g., caller ID, IP addresses, time of day, duration, type of communication, etc.) obtained from the communication. As mentioned earlier, those skilled in the art will appreciate that the data received at the communication device can exist in many different forms, such as telephone calls, text messages, multimedia messages, audio data, video data and the like.

The data is recorded at the communication device 302. The data can be recorded in total, partially or in any combination thereof. Additionally, the data can be in the form of one large data set, a plurality of data sets that make up a larger data set, or any combination thereof. Further, it will be appreciated that all or a portion of the data may only be recorded temporarily for processing and then discarded.

The communication or data is identified 304. For example, the identification process can include extracting a caller ID, phone number or name. In the alternative, the identification can involve determining the type of communication (e.g., voice call, text message, PTT, VoIP), and identify data (e.g., caller ID, phone number, name, email address, Internet Protocol (IP) address). Still further, it will be appreciated that multiple levels of ranking can be employed. For example, a specific identifier can be ranked by itself, but it may also be aggregated to combination ranking, such as an individual who has multiple identifiers associated (e.g., work, home, mobile, email). Accordingly, ranking may be aggregated so that the total number of monitored communications with a party of interest may be determined.

An identifier is associated with a particular data set residing within the received data, wherein the origination identifier is used to identify pertinent characteristics relating to the data set. For example, the origination identifier indicates a unique source of origin and an identification mechanism for the particular data set within the received data. For example, if an incoming call includes the data of interest, then the origination identifier is the phone number associated with the incoming call.

A call score is calculated to denote at least a time the particular data set was received and a frequency of occurrence for the particular data set in a plurality of transmissions to the communication device 306. In one embodiment, the call score can be thought of as a set of data including the raw score itself and other information associated (e.g., time, type of call, etc.) with each listed identifier (e.g., number). This could be represented by a structure such as:

```
struct CallScore
{
  int    lastCallTime;  // represents the time of last call activity
  int    lastAgedTime;  // represents the time the aging interval calculation
  was performed
  int    score;         // current ranking score
  int    currentRank;   // separate from score, because they may not be
  strictly the same due to hysteresis
  boolean ignoreNumber; // value that indicates this number should be not
  be included in frequency based rankings
};
```

The lastCallTime and lastAgedTime can be represented any of several standard ways, for instance (but not limited to) separate fields for month, day, year, hour, minutes and seconds or the number of seconds, minutes, days and/or months elapsed since a reference time (e.g., Jan. 1, 1970).

In at least one embodiment, a score calculation can be performed in a manner similar to that illustrated by the pseudo code provided below and further discussed in FIG. 3B.

```
if ((CallScore->score + SCOREFACTOR) < MAXINT)
  {
    CallScore->score = CallScore->score + SCOREFACTOR
  }
```

```
    else
    {
        CallScore->score = MAXINT
    }
```

Figure 3B:
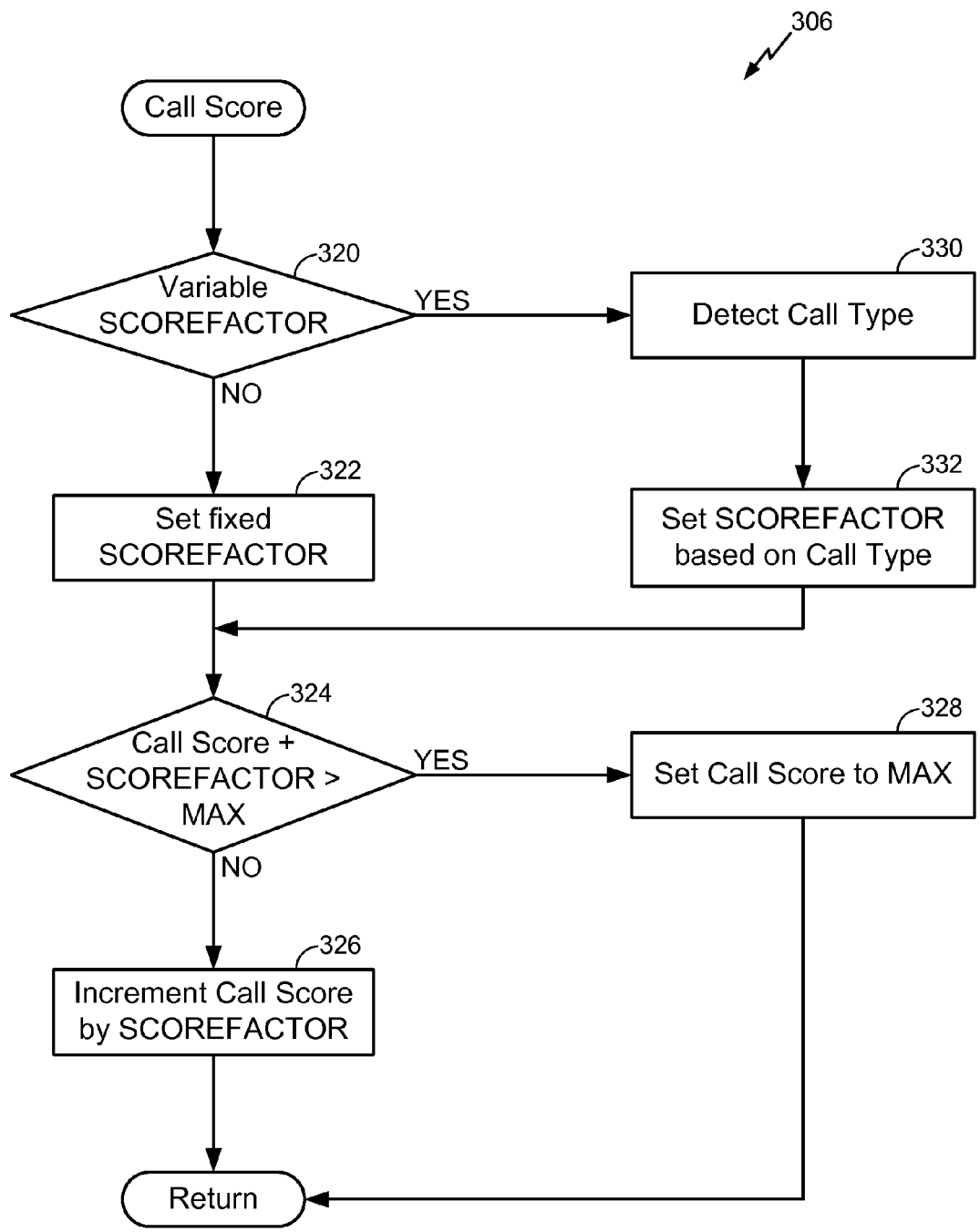
FIG. 3B is a flowchart illustrating an example of calculating a call score.

FIG. 3B is a flowchart for calculating a call score 306 in accordance with the pseudo code described above. However, embodiments are not limited to the foregoing example. For example, in alternative embodiments, the algorithm can be enhanced such that SCOREFACTOR varies for different call types. For instance SCOREFACTOR could be larger for outgoing calls than for incoming text messages. In this manner a call placed by the user could have greater ranking than multiple incoming text messages. Accordingly, calculating a call score 306 can include determining whether a fixed or variable SCOREFACTOR is used 320. If a fixed SCOREFACTOR is used, that value can be set 322 or alternatively, if the variable SCOREFACTOR is not an option, then the value could be a preset value (e.g., 1) and this process could start at 324. However, if a variable SCOREFACTOR is used, a call type (e.g., outgoing call, incoming text message, etc.) can be detected, 330. The SCOREFACTOR can then be set based on the call type 332. A simple lookup table could be used to set the SCOREFACTOR or the SCOREFACTOR could be calculated based on a default value and a multiplier for specific call types.

Once the SCOREFACTOR is determined, in 324, the call score can be determined and checked in comparison to a maximum value (e.g., MAXINT). If the call score plus the SCOREFACTOR is not greater than the maximum value, the call score is incremented by the SCOREFACTOR. If the call score plus the SCOREFACTOR is greater than the maximum value, the call score is set to the maximum value. Establishing a maximum value for the call score can prevent short time actions, such as a series of calls to one party for a given transaction, from overwhelming consistently called numbers. For example, the aging function described below, in combination with a maximum call score can reduce the long term impact of a single set of transactions.

Referring, back to FIG. 3A, the particular data set is ranked in a list in accordance with the calculated call score 308. Optionally, in 310, an ignoreNumber flag can be set for certain numbers, so they are masked from the ranked data that is displayed. The ranked data set (e.g., call list, directory, etc.) is then displayed to the user 312 (less any numbers with the ignoreNumber set). The process may continuously update itself and may return to receiving data 300 when new data, such as, a new phone call is received.

For example, phone numbers can be sorted based on the number of calls made and how recently they were made. This would allow a number that was called once a week ago to appear higher in the list than a number that was called once a month ago. Therefore, by having a listing sorted by frequency and time since the calls were made highest ranked numbers can appear in the phone directory in the beginning so that a user does not have to scroll inconveniently to get to the numbers.

Figure 4:
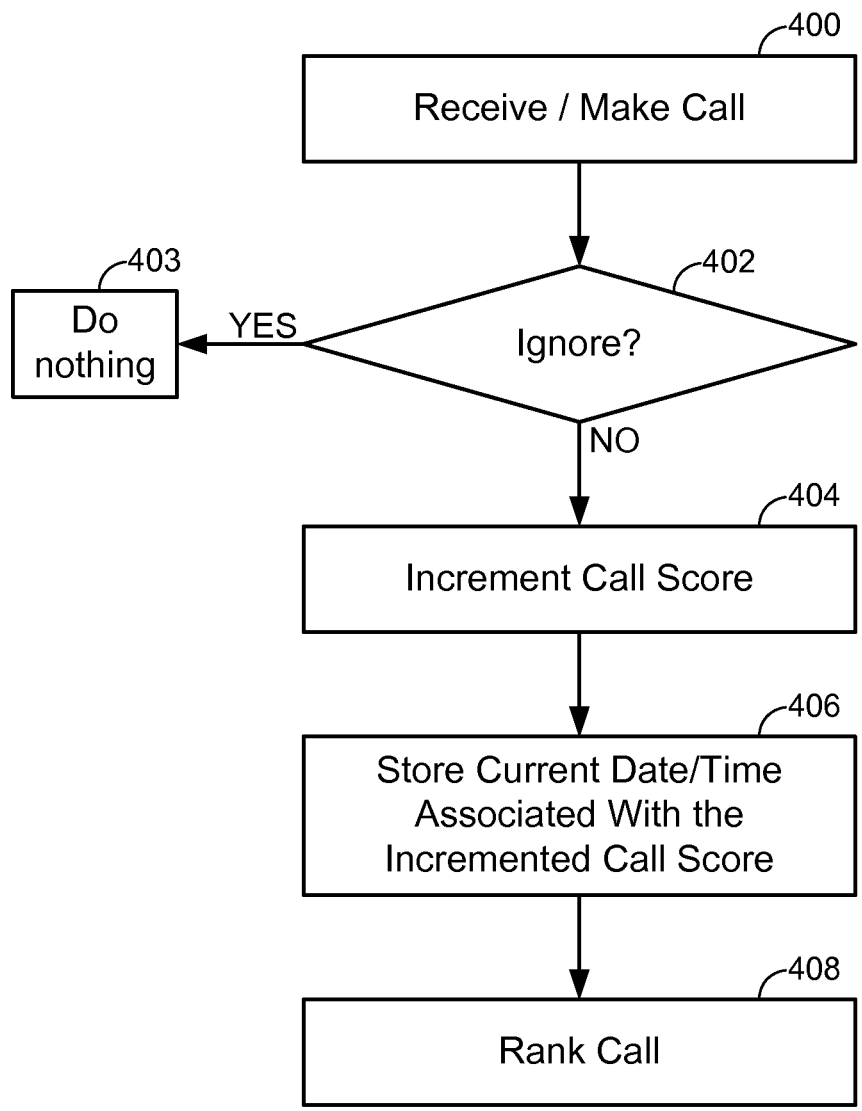
FIG. 4 is a flowchart illustrating additional aspects of a process for organizing a call list.

In another embodiment, the communication may be a phone call. In FIG. 4, the phone call is received/made at a communication device 400. If this is a phone call that a user is not interested in tracking or maintaining a record of, then this particular phone call number is not logged and nothing is done 403. If the phone call is one that a user is interested in tracking or maintaining a record of, then the particular phone call number is logged and a previous call score associated with that particular phone call is incremented (or manipulated in some other manner to change the call score) and the information including the phone number, call score, and current date/time is collected 404.

The user can indicate if they are interested/not interested in the call in various ways, e.g., only those in the phone book, a separate set of numbers selected by the user, particular area code(s), etc. In additional embodiments, the list of interested calls/numbers can also include other possibilities such as all incoming calls, all outgoing calls, incoming text/picture messages, outgoing text/picture messages, etc. Each of these lists can be configured as being of interest or not of interest and can be combined in different orders and priorities. For example, a list can be subject to a set of filtering rules that are applied in a specific order to further refine combination filters (e.g., text messages from a particular area code).

Alternatively, all calls can be tracked in some embodiments (e.g., the decision in 402 is skipped). The user may specifying an "ignore" option the in the address book or directly in the sorted list. This could set the ignoreNumber flag in CallScore. In some embodiments, even if with ignoreNumber set, these numbers could be sorted/tracked, but not displayed (e.g., as discussed above in relation to FIG. 3A). It will be appreciated that the foregoing examples are provided for discussion and to aid in understanding the various embodiments and do not limit embodiments to the listed examples. A current date/time associated with the incremented call score is stored 406. Based upon their respective scores, the received calls are ranked 408.

In another embodiment, a recalculation function can be provided. The recalculation function can process stored call information (e.g., in a call log) for numbers that are changed from the ignore status. For example, once the ignoreNumber flag is changed so the number is no-longer ignored, the routine can be processed only for the changed number looking at stored call records. Accordingly, any calls that were previously logged can be used to preload the CallScore value so the rankings will be reflective of the recent activity instead of the number just being initialized to a zero state.

An aging interval can be applied to the process by which phone numbers that have not been used recently are reduced in priority, and the list can be resorted. The aging process could be performed after each call, on demand (for example immediately before the calling list is to be displayed), or in the background at regular intervals (such as once a day, once an hour etc) depending on considerations such as, user experience, performance, and/or battery level.

The aging function/calculation can be designed to slowly move numbers further down the list when they have not been used for a while. An example of how this calculation could be performed is provided in the pseudo code below:

```
{
    unsigned int agingInterval // amount of time since the last aging
    calculations were performed
    agingInterval = CURRENTTIME - callScore->lastAgedTime
    if ((CallScore->score - (agingInterval * AGEFACTOR) > 0)
    {
        CallScore->score = CallScore->score - (agingInterval *
        AGEFACTOR)
    }
    else
    {
        CallScore->score = 0
    }
    CallScore->lastAgedTime = CURRENTTIME
}
```

Figure 5:
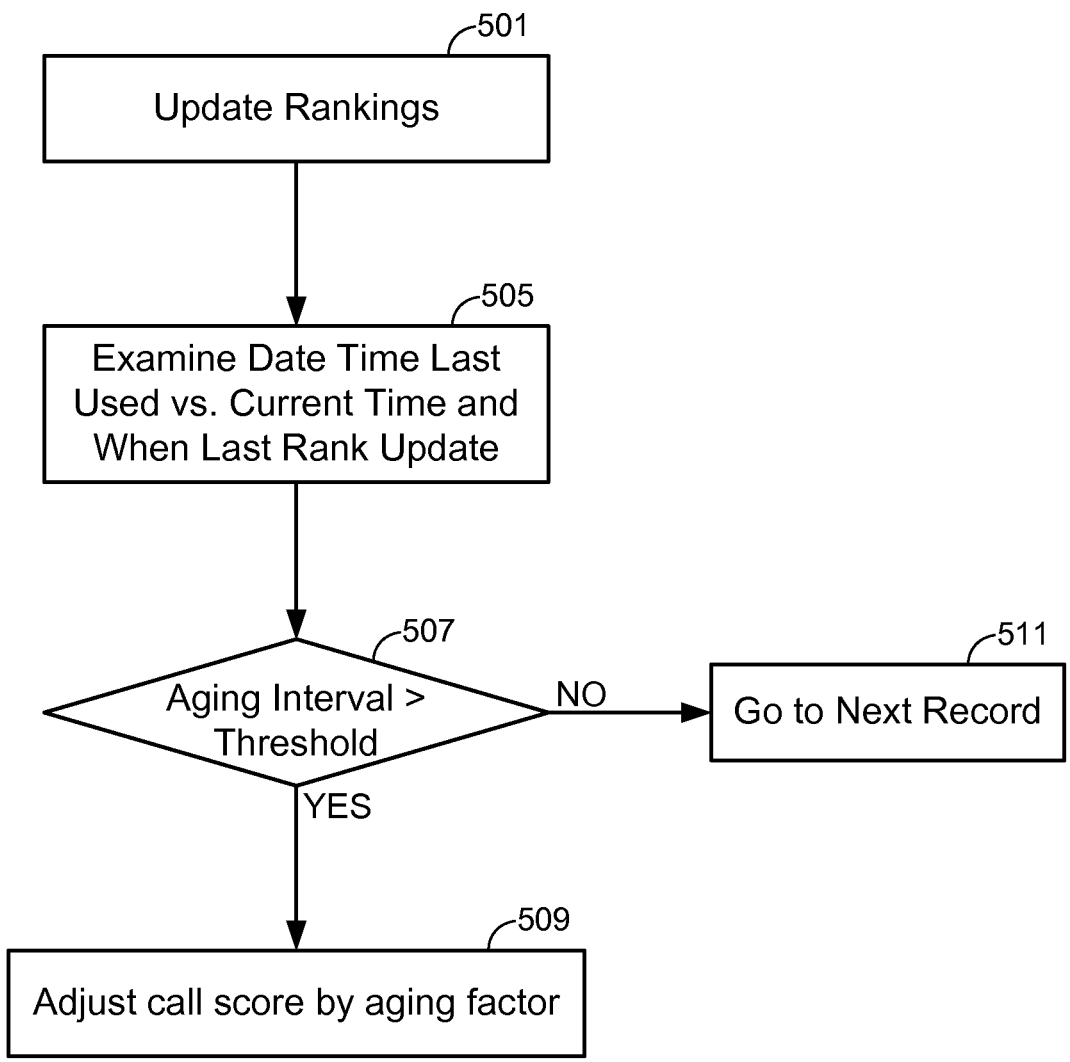
FIG. 5 is a flowchart illustrating additional aspects of an aging process for organizing a call list.

An example of an aging process flowchart is provided in FIG. 5. As noted above, based on some action or interval the rankings are updated 501. The rankings can be determined in a variety of manners as discussed above in relation to FIGS. 3A, 3B and 4. The date time last used is examined and this information is then compared to when the last rank was updated 505. An aging interval refers to how old or in the alternative how fresh a specific data set is.

If the aging interval is not greater than a threshold value 507, the call score is not adjusted and the process moves on to the next record 511 and increment through each record until all are updated. Each record (e.g., entry in directory/list) can be evaluated each time a change in the call score/rank is detected or on some other interval as discussed above. For purposes of the description, when a call score is incremented (or increased in value) it means that it has a higher priority (rank) than a lower valued score. In the foregoing examples, it was assumed that a higher score has a higher priority. However, it will also be appreciated that any ranking scheme can be used in various embodiments (e.g., a lower score could have a higher priority).

If the aging interval is greater than a threshold value in 507, then the call score can be adjusted based on an aging factor 509. For example, the call score could be adjusted as illustrated in the foregoing pseudo code. Alternatively, the call score could be adjusted in any other way (e.g., a simple decrement of a counter, etc.) and it will be appreciated that the embodiments are not limited to the specific examples provided herein.

In another embodiment, the numbers list can additionally be updated based on the number of calls received from that number. In this embodiment, the most used numbers appear higher in the list.

In another embodiment, numbers could be marked to be ignored by the sorting process. Conventional systems have typically addressed this problem by using assigned speed dial numbers or by dividing numbers into groups, such as "VIP", "Work", or "Family". For example, numbers on speed dial need not appear high in the list.

In another embodiment, a hysteresis function could be implemented so that two numbers called frequently would not continually swap places in the list. This function could be a mathematical algorithm that would dampen or control the oscillation of two entries that are so close in rankings that they continue to swap into and out of the lead position in the list. This oscillation back and forth could be potentially distracting and irritating to an end user. A weighting factor could be used to dampen the oscillation and not change until a certain amount of calls or data entries have been registered. Until a certain level or value of weighting is attained, the position in the list would not change until a threshold value is reached.

For example, to implement a hysteresis function when sorting, the call score can be compared between records, but only changed when the call score is greater than the current rank (and thus the ordering of the list) when the difference between two records exceeds a given threshold. To be useful (that is to prevent the constant swapping of two equally frequently called numbers) the hysteresis threshold should be larger than the SCOREFACTOR.

Further, the arrangement of the logic elements is merely for the convenience of illustration and should not be construed as limiting the embodiments. As will be appreciated by those skilled in the art, the functionality of the logic elements described herein may be integrated into one element or distributed as desired among various hardware and software elements.

Those skilled in the art will appreciate that there is no particular order of performing and executing the method functional blocks intended or implied in the preceding description. The foregoing methods discussed above can be used by themselves or in any combination thereof to achieve the same objective.

Also, as will be appreciated from the foregoing examples, embodiments can include apparatuses and systems for performing the functions discussed herein. For example, an embodiment can include an apparatus such as the access terminal 102 in FIG. 2, including logic configured to receive a communication, logic configured to identify the communication, logic configured to associate the communication with a pre-programmed response, and logic configured to respond to the communication using the pre-programmed response. However, in other embodiments, as discussed herein, the logic may reside on a server or a combination of both an access terminal and a server in communication with the access terminal. Those skilled in the art will appreciate that the functionalities described herein may be embodied in may forms and may be integrated into a single device or separated over many devices in communication with one another. Accordingly, the illustrated embodiments are not to be construed as limiting the scope of the invention.

Those skilled in the art will appreciate that any of the functions described herein can be embodied as various logic elements (whether hardware, software, computer readable media or combinations of each) in the apparatus. For example, embodiments can include, among other functions described herein, communication device further having a communications organizer comprising: logic configured to record data associated with a communication at the communication device; logic configured to associate an identifier with the communication, wherein the identifier indicates a unique identity; logic configured to calculate a call score for the identifier at the communication device based on the communication; and logic configured to rank the identifier in a list in accordance with the calculated call score. Accordingly, embodiments are not limited to the logical elements expressly discussed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The logic may also be implemented using a combination of computing devices, e.g., a combination of a DSP and a microprocessor, a plurality of microprocessors, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. In the alternative, the processor and the storage medium may reside as discrete components in the access terminal.

Accordingly, at least one embodiment can include a computer readable media embodying a method for pre-programmed subscriber responses as discussed herein. Accordingly, the various embodiments are not limited to the illustrated examples and any means for performing the functionality described herein are included in the various embodiments.

While the foregoing disclosure shows illustrative embodiments, it should be noted that various changes and modifications could be made herein without departing from the scope of the invention as defined by the appended claims. The functions, steps and/or actions of the method claims in accordance with the embodiments described herein need not be performed in any particular order. Furthermore, although elements of the embodiments may be described or claimed in the singular, the plural is contemplated unless limitation to the singular is explicitly stated.

What is claimed is:

1. A method for organizing communications comprising:
    recording data associated with a plurality of communications at a communication device;
    associating an identifier with each of the plurality of communications, wherein the identifier indicates a unique identity;
    calculating a call score at the communication device for each of at least a subset of the identifiers based on the communication corresponding to each identifier in the subset, wherein the call score denotes at least a frequency of occurrence for the corresponding identifier, and the call score is less than or equal to a maximum call score value; and
    ranking the subset of the identifiers for which call scores have been calculated in accordance with the calculated call score to form a list of ranked identifiers, wherein each ranked identifier has an associated position in the list.

2. The method of claim 1, wherein the call score for each identifier is related to a time of occurrence of the communication associated with the identifier.

3. The method of claim 1, wherein the identifier is at least one of a phone number, name, email address, or Internet Protocol (IP) address.

4. The method of claim 1, further comprising:
    applying a hysteresis function to the ranking by advancing an identifier to a greater position in the list when the corresponding calculated call score exceeds a calculated call score of another identifier by at least a given threshold, and not advancing the identifier to the greater position in the list when the corresponding calculated call score does not exceed the calculated call score of the another identifier by at least said given threshold.

5. The method of claim 1, further comprising:
    ignoring at least one identifier.

6. The method of claim 5, wherein ignoring the at least one identifier comprises:
    determining the at least one identifier is not of interest; and
    omitting the call score calculation for the at least one identifier not of interest.

7. The method of claim 5, wherein ignoring the at least one identifier comprises:
    displaying the list on a display of the communication device, and
    setting a flag associated with the at least one identifier such that the at least one identifier is not displayed in the displayed list.

8. The method of claim 1, further comprising:
    aggregating at least two identifiers to form a combined ranking.

9. The method of claim 8, where in the at least two identifiers include a first phone number and a second phone number associated with a single entity.

10. The method of claim 9, wherein the combined ranking is associated with the single entity.

11. The method of claim 1, further comprising:
    determining a communication type for each of the plurality of communications based on the recorded data, wherein the plurality of communications comprises a first communication with a first communication type and a first call score, and a second communication with a second communication type and a second call score; and
    setting a first factor based on the first communication type by which to increment the first call score, and a second factor based on the second communication type by which to increment the second call score, wherein:
    the first call score is calculated using the first factor, and the second call score is calculated using the second factor; and
    the first factor is not equal to the second factor.

12. The method of claim 11, wherein the first communication type and the second communication type are each selected from the group consisting of a voice call, text message, multimedia message, audio data, video data, Voice-Over-Internet Protocol (VoIP) call, and a push-to-talk (PTT) call.

13. The method of claim 11, wherein each of the first communication type and the second communication type is one of an incoming or outgoing communication.

14. The method of claim 1, further comprising:
    displaying the identifier in the list based on the ranking.

15. The method of claim 1, further comprising:
    examining time information associated with call scores for identifiers in the list; and
    applying an aging function to call scores for identifiers in the list associated with communications that exceed a threshold age based on the time information.

16. The method of claim 1, wherein calculating the call score using the factor further comprises:
    calculating the sum of the call score and the factor, and setting the call score to the lesser of two values:

(1) the sum of the call score and the factor, or
(2) the maximum call score value.

17. The method of claim 16, further comprising:
examining an aging interval associated with call scores for identifiers in the list, and
applying an aging function to call scores for identifiers in the list that exceed a threshold based on the aging interval.

18. A communication device including a communications organizer comprising:
means for recording data associated with a plurality of communications at the communication device;
means for associating an identifier with each of the plurality of communications, wherein the identifier indicates a unique identity;
means for setting a maximum allowed value for a call score to be associated with each identifier;
means for calculating the call score for each of at least a subset of the identifiers based on the communication corresponding to each identifier in the subset, wherein the call score denotes at least a frequency of occurrence for the corresponding identifier, and the call score is less than or equal to the maximum call score value; and
means for ranking the subset of the identifiers for which call scores have been calculated in accordance with the calculated call score to form a list of ranked identifiers, wherein each ranked identifier has an associated position in the list.

19. The communication device of claim 18, wherein the call score for each identifier is related to a time of occurrence of the communication associated with the identifier.

20. The communication device of claim 18, wherein the identifier is at least one of a phone number, name, email address, or Internet Protocol (IP) address.

21. The communication device of claim 18, further comprising:
means for applying a hysteresis function to the ranking, wherein the means further comprises means for advancing an identifier to a greater position in the list when the corresponding calculated call score exceeds a calculated call score of another identifier by at least a given threshold, and means for not advancing the identifier to the greater position in the list when the corresponding calculated call score does not exceed the calculated call score of the another identifier by at least said given threshold.

22. The communication device of claim 18, further comprising:
means for ignoring at least one identifier.

23. The communication device of claim 22, wherein the means for ignoring the at least one identifier comprises:
means for determining the at least one identifier is not of interest; and
means for omitting the call score calculation for the at least one identifier not of interest.

24. The communication device of claim 23, wherein the means for ignoring the at least one identifier comprises:
means for displaying the list on a display of the communication device, and
means for setting a flag associated with the at least one identifier such that the at least one identifier is not displayed in the displayed list.

25. The communication device of claim 18, further comprising:
means for aggregating at least two identifiers to form a combined ranking.

26. The communication device of claim 25, where in the at least two identifiers include a first phone number and a second phone number associated with a single entity.

27. The communication device of claim 26, wherein the combined ranking is associated with the single entity.

28. The communication device of claim 18, further comprising:
means for displaying the identifier in the list based on the ranking.

29. The communication device of claim 18, further comprising:
means for examining time information associated with call scores for identifiers in the list; and
means for applying an aging function to call scores for identifiers in the list associated with communications that exceed a threshold age based on the time information.

30. The communication device of claim 18, wherein calculating the call score using the factor further comprises:
means for calculating the sum of the call score and the factor, and
means for setting the call score to the lesser of two values:
(1) the sum of the call score and the factor, or
(2) the maximum call score value.

31. The communication device of claim 30, further comprising:
means for examining an aging interval associated with call scores for identifiers in the list, and
means for applying an aging function to call scores for identifiers in the list that exceed a threshold based on the aging interval.

32. The communication device of claim 18, further comprising:
means for determining a communication type for each of the plurality of communications based on the recorded data, wherein the plurality of communications comprises a first communication with a first communication type and a first call score, and a second communication with a second communication type and a second call score; and
means for setting a first factor based on the first communication type by which to increment the first call score, and a second factor based on the second communication type by which to increment the second call score, wherein:
the first call score is calculated using the first factor, and the second call score is calculated using the second factor; and
the first factor is not equal to the second factor.

33. The communication device of claim 32, wherein the first communication type and the second communication type are selected from the group consisting of a voice call, text message, multimedia message, audio data, video data, Voice-Over-Internet Protocol (VoIP) call, and push-to-talk (PTT) call.

34. The communication device of claim 32, wherein each of the first communication type and the second communication type is one of an incoming or outgoing communication.

35. A method for organizing a plurality of communications comprising:
recording data associated with the plurality of communications at a communication device;
associating an identifier with the each of the plurality of communications, wherein the identifier indicates a unique identity;
setting a maximum allowed call score value to be associated with each identifier;

calculating the call score for each of at least a subset of the identifiers based on the communication corresponding to each identifier in the subset, wherein the call score denotes at least a frequency of occurrence for the corresponding identifier, and the call score is less than or equal to the maximum call score value; and ranking the subset of the identifiers for which call scores have been calculated in accordance with the calculated call score to form a list of ranked identifiers, wherein each ranked identifier has an associated position in the list.

36. The method of claim 35, wherein the call score for each identifier is related to a time of occurrence of the communication associated with the identifier.

37. The method of claim 35, wherein the identifier is at least one of a phone number, name, email address, or Internet Protocol (IP) address.

38. The method of claim 35, further comprising:
applying a hysteresis function to the ranking by advancing an identifier to a greater position in the list when the corresponding calculated call score exceeds a calculated call score of another identifier by at least a given threshold, and not advancing the identifier to the greater position in the list when the corresponding calculated call score does not exceed the calculated call score of the another identifier by at least said given threshold.

39. The method of claim 35, further comprising:
step for ignoring at least one identifier.

40. The method of claim 39, wherein ignoring the at least one identifier comprises:
determining the at least one identifier is not of interest; and
omitting the call score calculation for the at least one identifier not of interest.

41. The method of claim 39, wherein ignoring the at least one identifier comprises:
displaying the list on a display of the communication device, and
setting a flag associated with the at least one identifier such that the at least one identifier is not displayed in the displayed list.

42. The method of claim 35, further comprising:
step for aggregating at least two identifiers to form a combined ranking.

43. The method of claim 42, where in the at least two identifiers include a first phone number and a second phone number associated with a single entity.

44. The method of claim 43, wherein the combined ranking is associated with the single entity.

45. The method of claim 35, further comprising:
determining a communication type for each of the plurality of communications based on the recorded data, wherein the plurality of communications comprises a first communication with a first communication type and a first call score, and a second communication with a second communication type and a second call score; and
setting a first factor based on the first communication type by which to increment the first call score, and a second factor based on the second communication type by which to increment the second call score, wherein:
the first call score is calculated using the first factor, and the second call score is calculated using the second factor; and
the first factor is not equal to the second factor.

46. The method of claim 35, wherein the first communication type and the second communication type is at least one of a voice call, text message, multimedia message, audio data, video data, Voice-Over-Internet Protocol (VoIP) call, or push-to-talk (PTT) call.

47. The method of claim 35, wherein the each of the first communication type and the second communication type is one of an incoming or outgoing communication.

48. The method of claim 35, further comprising:
displaying the identifier in the list based on the ranking.

49. The method of claim 35, further comprising:
examining time information associated with call scores for identifiers in the list; and
applying an aging function to call scores for identifiers in the list associated with communications that exceed a threshold age based on the time information.

50. The method of claim 35, wherein calculating the call score using the factor further comprises:
calculating the sum of the call score and the factor, and setting the call score to the lesser of two values:
(1) the sum of the call score and the factor, or
(2) the maximum call score value.

51. The method of claim 50, further comprising:
examining an aging interval associated with call scores for identifiers in the list, and
applying an aging function to call scores for identifiers in the list that exceed a threshold based on the aging interval.

52. A communication device including a communications organizer comprising:
logic configured to record data associated with a plurality of communications at the communication device;
logic configured to associate an identifier with each of the plurality of communications, wherein the identifier indicates a unique identity;
logic configured to calculate a call score at the communication device for each of at least a subset of the identifiers based on the communication corresponding to each identifier in the subset, wherein the call score denotes at least a frequency of occurrence for the corresponding identifier, and the call score is less than or equal to a maximum call score value; and
logic configured to rank the subset of the identifiers for which call scores have been calculated in accordance with the calculated call score to form a list of ranked identifiers, wherein each ranked identifier has an associated position in the list.

53. The communication device of claim 52, wherein the each call score for each identifier is related to a time of occurrence of the communication associated with the identifier.

54. The communication device of claim 52, wherein the identifier is at least one of a phone number, name, email address, or Internet Protocol (IP) address.

55. The communication device of claim 52, further comprising:
logic configured to apply a hysteresis function to the ranking by advancing an identifier to a greater position in the list when the corresponding calculated call score exceeds a calculated call score of another identifier by at least a given threshold, and not advancing the identifier to the greater position in the list when the corresponding calculated call score does not exceed the calculated call score of the another identifier by at least said given threshold.

56. The communication device of claim 52, further comprising:
logic configured to ignore at least one identifier.

57. The communication device of claim 56, wherein the logic configured to ignore the at least one identifier comprises:
  logic configured to determine the at least one identifier is not of interest; and
  logic configured to prevent the call score from being calculated for the at least one identifier not of interest.

58. The communication device of claim 56, wherein the logic configured to ignore the at least one identifier comprises:
  logic configured to display the list on a display of the communication device, and
  logic configured to set a flag associated with the at least one identifier such that the at least one identifier is not displayed in the displayed list.

59. The communication device of claim 52, further comprising:
  logic configured to aggregate at least two identifiers to form a combined ranking.

60. The communication device of claim 59, where in the at least two identifiers include a first phone number and a second phone number associated with a single entity.

61. The communication device of claim 60, wherein the combined ranking is associated with the single entity.

62. The communication device of claim 52, further comprising:
  logic configured to determine a communication type for each of the plurality of communications based on the recorded data, wherein the plurality of communications comprises a first communication with a first communication type and a first call score, and a second communication with a second communication type and a second call score; and
  logic configured to set a first factor based on the first communication type by which to increment the first call score, and a second factor based on the second communication type by which to increment the second call score, wherein:
    the first call score is calculated using the first factor, and the second call score is calculated using the second factor; and
    the first factor is not equal to the second factor.

63. The communication device of claim 62, wherein the first communication type and the second communication type is at least one of a voice call, text message, multimedia message, audio data, video data, Voice-Over-Internet Protocol (VoIP) call, or push-to-talk (PTT) call.

64. The communication device of claim 62, wherein each of the first communication type and the second communication type is one of an incoming or outgoing communication.

65. The communication device of claim 52, further comprising:
  a display capable of displaying the identifier in the list based on the ranking.

66. The communication device of claim 52, further comprising:
  logic configured to examine time information associated with call scores for identifiers in the list; and
  logic configured to apply an aging function to call scores for identifiers in the list associated with communications that exceed a threshold age based on the time information.

67. The communication device of claim 52, wherein calculating the call score using the factor further comprises logic configured to:
  calculate the sum of the call score and the factor, and
  set the call score to the lesser of two values:
    (1) the sum of the call score and the factor, or
    (2) the maximum call score value.

68. The communication device of claim 67, further comprising:
  logic configured to examine an aging interval associated with call scores for identifiers in the list, and
  logic configured to apply an aging function to call scores for identifiers in the list that exceed a threshold based on the aging interval.

* * * * *